United States Patent [19]
Hufford

[11] Patent Number: 5,411,232
[45] Date of Patent: May 2, 1995

[54] UNION FOR SENSOR MOUNTING ASSEMBLY

[76] Inventor: Donald L. Hufford, 11741 Villa Rd., Charlevoix, Mich. 49720

[21] Appl. No.: 27,007

[22] Filed: Mar. 5, 1993

[51] Int. Cl.⁶ ............................................. A47B 96/06
[52] U.S. Cl. .................... 248/231.3; 249/49; 403/370
[58] Field of Search ............... 403/236, 234, 297, 268, 403/370, 367; 248/231.3, 49

[56] References Cited

U.S. PATENT DOCUMENTS

| | | |
|---|---|---|
| 612,489 | 10/1898 | Dean . |
| 624,232 | 5/1899 | Marty . |
| 1,037,277 | 9/1912 | Martin . |
| 1,045,583 | 11/1912 | Mills . |
| 1,416,386 | 5/1922 | Selah . |
| 1,803,508 | 5/1931 | Rossman . |
| 1,835,339 | 12/1931 | Rossman . |
| 1,867,107 | 7/1932 | Schmidt, Jr. . |
| 1,964,427 | 6/1934 | Chandler ................................ 85/2.4 |
| 2,037,980 | 4/1936 | Heartz . |
| 2,177,138 | 10/1939 | Hollander . |
| 2,219,655 | 10/1940 | Markey . |
| 2,461,762 | 2/1949 | O'Donnell . |
| 2,583,368 | 1/1952 | French . |
| 2,651,804 | 9/1953 | Wilkin . |
| 3,092,407 | 6/1963 | Blonder . |
| 3,528,691 | 9/1970 | Matich, Jr. ........................ 287/52.05 |
| 3,752,430 | 8/1973 | Kenyon et al. .................. 403/370 X |
| 3,841,774 | 10/1974 | Maxey ................................ 403/358 |
| 4,128,219 | 12/1978 | Kaiglor et al. ................... 248/49 X |
| 4,274,301 | 6/1981 | Katayama ....................... 403/370 X |
| 4,702,448 | 10/1987 | LoJacono et al. . |

FOREIGN PATENT DOCUMENTS 757171  12/1933  France .

OTHER PUBLICATIONS

CPI publication showing clamp blocks.
Automation Products Group publication showing double boom mount.

*Primary Examiner*—Douglas D. Watts
*Attorney, Agent, or Firm*—Price, Heneveld, Cooper, DeWitt & Litton

[57] ABSTRACT

A union for sensor mounting assemblies has a body with a stem extending from the body to a terminal end. The stem is received within a boom and has an inclined surface extending from the terminal end toward the body. The stem includes a cam provided with a cam surface slidably abutting the inclined surface, so that the cam slides along the inclined surface between an open position and a closed or locked position. The stem and the cam have aligned, opposing, flattened sides defining a cross section for each of the stem and the cam as a truncated circular arc section. A draw member or bolt interconnects the cam and the stem extends generally parallel to the inclined and cam surfaces. In the open position, the stem and cam of the union may be received in or withdrawn from a cavity in a support boom. In the locked position, the union is rigidly connected with the support boom.

11 Claims, 4 Drawing Sheets

UNION FOR SENSOR MOUNTING ASSEMBLY

BACKGROUND OF THE INVENTION

The present invention relates to couplings and clamps, and has particular usefulness in relation to mounting assemblies for sensors and instrumentation.

Mounting assemblies for sensors and instrumentation commonly comprise a framework of tubular members or booms and rails and the like interconnected with various coupling devices. A wide variety of coupling and mounting clamps have been used to join rigid members at different angles, such as are used in the coupling of cross bars and supports, scaffolding members, and the like. A number of existing coupling or clamp constructions utilize a clamp element that clamps about a main support boom, with a side rail or rails also connected to the clamp. Commonly, the side rail will overlay the main support boom and will, thus, be offset to one side or another of the support boom. However, such offset may be undesirable in particular applications.

Further, in some prior couplings, a side rail or a pair of side rails may be clamped along a length of a main support boom with the side rail laying in generally the same plane as the support boom and having one end of the side rail abutting a side of the support boom. However, such couplings typically do not accommodate positioning the side rail at an end of the main support boom, but require positioning of the side rial along the length of the support boom. In some applications requiring close clearance along the side rail, such a situation may not be tolerable. In such an application, what may be referred to as an end clamp for coupling a side rail across an end of a support boom is required.

Some presently known end clamps clamp around the side rail and around the main support boom. However, such clamps are typically configured for a particular size of side rail and a particular size of support boom. Other known end clamps attach by inserting a stein or tang of the clamp into the interior cavity of a tubular support boom. Again, these clamps are commonly configured for a particular size support boom. When use of either of the two styles of end clamps, exterior or interior fitting, is attempted with a boom or rail size other than that for which the clamp is designed, the clamp will commonly either not be usable with that different size or will provide inadequate stability in the mounting assembly, resulting in unacceptable deflection or rotation of the side rail relative to the support boom.

SUMMARY OF THE INVENTION

The present invention is embodied in a support boom assembly including a union that couples a side member with a support boom member. The union has an elongated body or stem that is releasably received in a cavity which opens through one end of the support boom member. The stem has an inclined surface extending along its length, and a cam with a cooperating cam surface abuts and slides along the stem's inclined surface. A draw member or bolt interconnects the cam and union body and is used to slide tile cam along tile inclined surface of the stem. Preferably, the draw member is oriented at tile same general angle as the inclined surface of the stem, so that the sliding force is applied directly along the angle of the stem's inclined camming surface. The cam "ramps" up and down relative to the stein as tile cam slides along the stem's inclined surface. Orienting the draw member at about the angle of the inclined surface of the stem strengthens the union by avoiding unnecessary toggling forces which would be created by positioning the draw member away from the angle of tile inclined surface, toward alignment with the support boom, for example. As the cam is slid along the stem, the cam shifts between an open position, in which the stein and cam are releasably received within and rotate within the boom cavity, and a locked position, in which the stem and cam are fixed within tile cavity, securely connecting the union with the boom. Preferably, the stem and cam include generally planar, opposing side walls that define a cross-sectional shape through the stem that is narrower than what would otherwise be the diametric width of the stem. Since the stem has narrowed sides, when the cam is slid along the stem to an open position, the stem and cam can be inserted into a support boom cavity that is much narrower than what the diameter of the stem would otherwise allow. Nonetheless, the cam may still be slid out to lock into a much larger support boom cavity. A side rail is at the second end of the union. Thus, through use of the camming union of the invention, the side rail may be rotationally adjusted relative to the support boom and firmly fastened with the support boom.

The support boom assembly incorporating the union of the present invention is particularly suited to coupling side rails to a main support boom for mounting instrumentation, including, but not limited to, sensors, vacuum cups, and the like, on the side rail. With the union of the present invention, a positive locking force is applied directly along the abutting surfaces of the stem and cam in order to apply a maximum locking force yet minimize binding of the angled camming surfaces as the union is being adjusted into a locked position. Further, the adjustable height to width ratio of the union of the present invention is greatly adaptable to a wide variety of support booms, both in terms of cross-sectional configuration, and in terms of the cross-sectional or diametric dimension of the internal cavity, while providing consistently high stability of the support boom assembly with which the coupling is used. Moreover, the union of the present invention may be coupled to the end of a support boom member, while one or more pair of angled or offset clamp blocks are used along the length of the support boom member in order to rigidly couple a number of instrument mounting side rails to the support boom.

These and other features, objects, and benefits of the invention will be recognized by those skilled in the art, from tile specification and claims which follow and the drawings attached hereto.

DETAILED DESCRIPTION OF THE PREFERRED EMBODIMENTS

Figure 1:
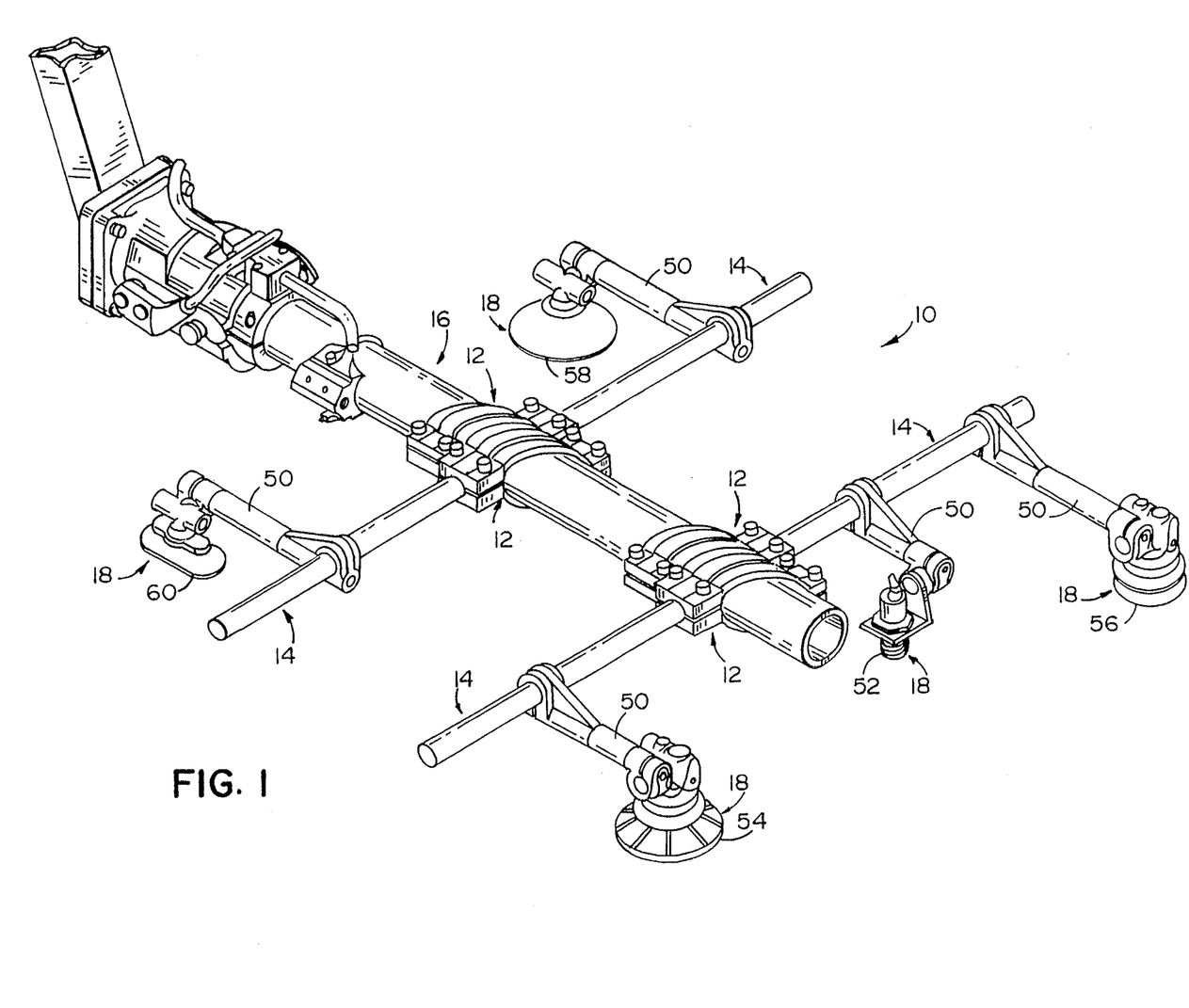
FIG. 1 is an oblique view of a sensor mounting assembly embodying the present invention.

The present invention is shown in a preferred form in FIG. 1 and referenced generally by numeral 10. In the preferred form shown in FIG. 1, mounting assembly 10 includes at least one complementary pair of clamps 12. Each clamp 12 couples a side rail 14 to a single central support boom 16. A series of instruments 18 are mounted by side rails 14 to support boom 16.

Figure 2:
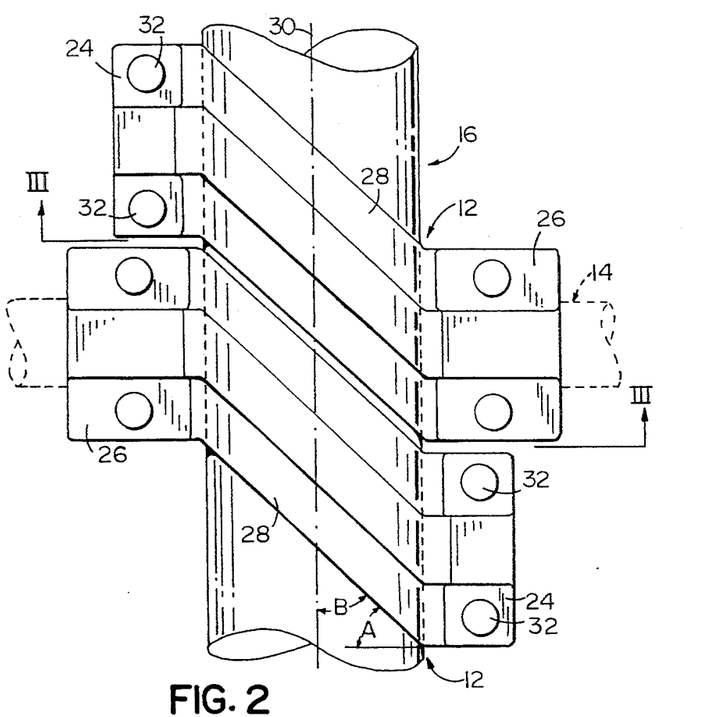
FIG. 2 is a plan view of a pair of adjacent clamp elements on a main support boom of the assembly shown in FIG. 1.
Figures 3, 4:
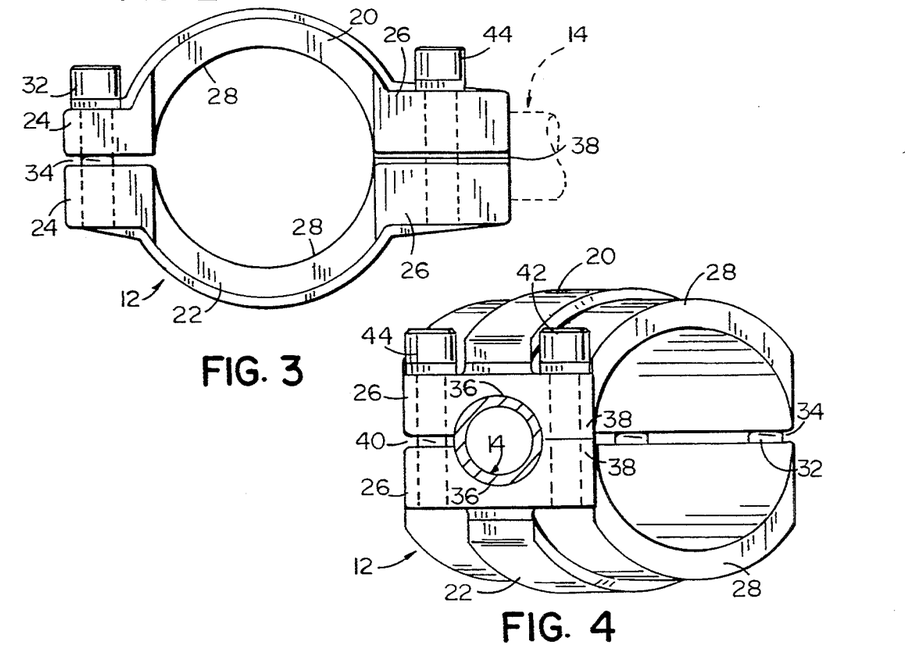
FIG. 3 is an end elevational view of one of tile clamp elements shown in FIG. 2 and taken along plane III—III.
FIG. 4 is a side elevational view of the clamp element shown in FIG. 3.

As shown in FIGS. 3 and 4, each clamp 12 has an upper clamp block 20 which mates with a complementary lower clamp block 22. As designated herein, "upper" and "lower" refer to the orientation shown in FIGS. 3 and 4, although clamps 12 may be oriented so that clamp blocks 20, 22 are positioned horizontally adjacent or otherwise rotated about support boom 16. As shown in FIGS. 2 and 3, each clamp block 20, 22 includes a clamping or joining end 24, a mounting end 26, and an intermediate clamping web 28 extending integrally between end 24 and 26.

Support boom 16 has a longitudinal axis 30 (FIG. 2). Most preferably, support boom 16 has a circular cross section with an outside diameter of about two and one-half inches, although other dimensions may be adapted to particular applications of assembly 10. Intermediate clamping webs 28 of clamp 12 extend about the perimeter of support boom 16, but extend at an oblique angle to longitudinal axis 30. Preferably, intermediate clamping webs 28 are arcuate, have an inner surface roughly corresponding to the outer diameter of support boom 16, and most preferably are radiused at one and one-fourth inches, and have a raised reinforced rib on the outer surface. Alternatively, boom 16 may have a rectangular of oblong cross section with webs 18 having correspondingly mating inner surfaces and dimensions to accommodate boom 16. Such configurations may, however, reduce the adjustability of clamp 12 about the perimeter of boom 16. Joining ends 24 and mounting ends 26 project normal to longitudinal axis 30 of boom 16. Joining ends 24 and mounting ends 26 of each clamp 12 preferably each extend, therefore, on an opposite radius of support boom 16, but are also offset along longitudinal axis 30 by the oblique angle of intermediate webs 28. Most preferably for a support boom 16 two and one-half inches in diameter, each clamping web 28 extends about 2.13 inches along longitudinal axis 30 and at an oblique angle "A" (FIG. 2) of about forty-two degrees across support boom 16, so that web 28 is oriented at an oblique angle "B" of about forty-eight degrees relative to boom longitudinal axis 30.

Each joining end 24 is a generally rectangular tab that is adjustably clamped by bolts 32. Intermediate clamping webs 28 space joining ends 24 slightly so as to form a small tightening gap 34 between opposed joining ends 24 (FIG. 3). Each mounting end 26 is a roughly rectangular tab that protrudes laterally from support boom 16 a slightly greater distance than joining ends 24. Most preferably, joining ends 24 protrude about one inch from support boom 16, while mounting ends 26 protrude about one and one-half inches from support boom 16. This slightly larger dimension of mounting ends 26 accommodates rigid seating of side rail 14. Each mounting end 26 includes a curved seat 36 (FIG. 4) that is dimensioned and curved to snugly accommodate side rail 14. Most preferably, side rails 14 each have an outside diameter of one inch, and curved seats 36 are radiused at one-half inch, but, alternatively, other dimensions and cross sections may be utilized. As shown in FIG. 4, immediately adjacent curved seats 36 on one side of mounting ends 26 are a pair of flattened, facing contact surfaces 38. Laterally adjacent the other side of curved seats 36, not contact surfaces are provided, so that a slight gap 40 (FIG. 4) is formed between the facing surfaces of mounting ends 26 on only one side. Mounting ends 26 are joined by a seat bolt 42 and an adjustment bolt 44 (FIG. 4).

Abutting contact surfaces 38 permit clamp 12 to remain fixedly clamped onto support boom 16, while curved seats 36 are loosened. When clamp 12 is positioned on support boom 16, set bolt 42 is tightened until contact surfaces 38 firmly abut. Joining end bolts 32 are tightened to fix clamp 12 onto support boom 16. Side rail 14 may be slid between curved seats 36 and rotated within curved seats 36. When side rail is correctly positioned, adjustment bolt 44 is tightened to fix rail 14 in position.

As shown in FIG. 1, side rails 14 mount one or more instrument swivel arms 50. Swivel arms 50 each mount an individual sensor or instrument, which as shown includes a proximity sensor 52, a traction vacuum pump 54, a combined collapsible vacuum cup and proximity sensor 56, a flat foot cup 58, and an oval flat foot cup 60.

As shown in FIGS. 1 and 2, a pair of diametrically opposed side rails 14 are mounted on support boom 16. Although two side rails 14 are mounted in opposition, each individual side rail 14 may be adjusted by loosening and repositioning the associated clamp 12. Since different sensors, probes, or instruments may be carried on each opposing side rail, the tolerance clearance of each side rail may require independent adjustment during operation. Further, although two clamps 12 are shown positioned in opposing direction in FIG. 2, the two clamps 12 are identical to each other, with one of the clamps 12 being turned one hundred eighty degrees from the other clamp.

While mounting ends 26 extend laterally, normal to longitudinal axis 30 in the preferred embodiment, mounting ends 26 may also extend at an oblique angle to longitudinal axis 30. In such an embodiment, side rail 14 will extend at an oblique angle to support boom 16, yet no moment arm is formed between the end of side rail 14 and mounting ends 36.

Figures 5, 10:
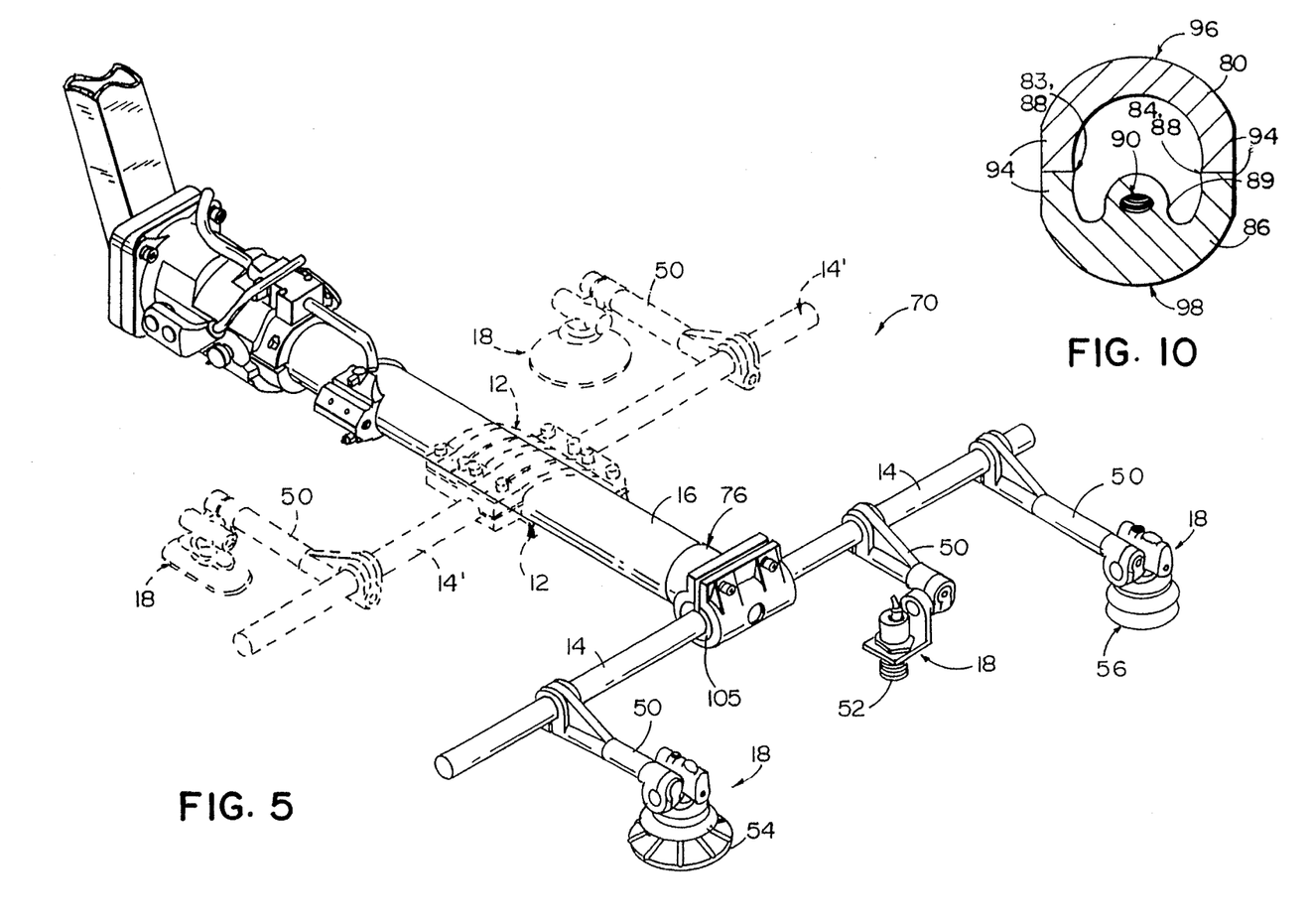
FIG. 5 is an oblique view of a second embodiment of a sensor mounting assembly embodying tile present invention.
FIG. 10 is a cross-sectional view of tile union shown in FIG. 7 and taken along plane X—X.

A second embodiment of the present invention is shown in a preferred form in FIG. 5 and referenced generally by numeral 70. In the preferred form shown in FIG. 5, mounting assembly 70 includes a union 76. Union 76 couples central support boom 16 and a side rail 14. A series of instruments 18 are mounted by side rail 14 to support boom 16. As shown in phantom in FIG. 5, mounting assembly 70 is compatible with and may be used with or without clamps 12, discussed in greater detail above, for coupling side rails 14' to boom 16, whereby additional instruments 18 may be mounted to boom 16 by side rails 14'.

Figures 6, 7:
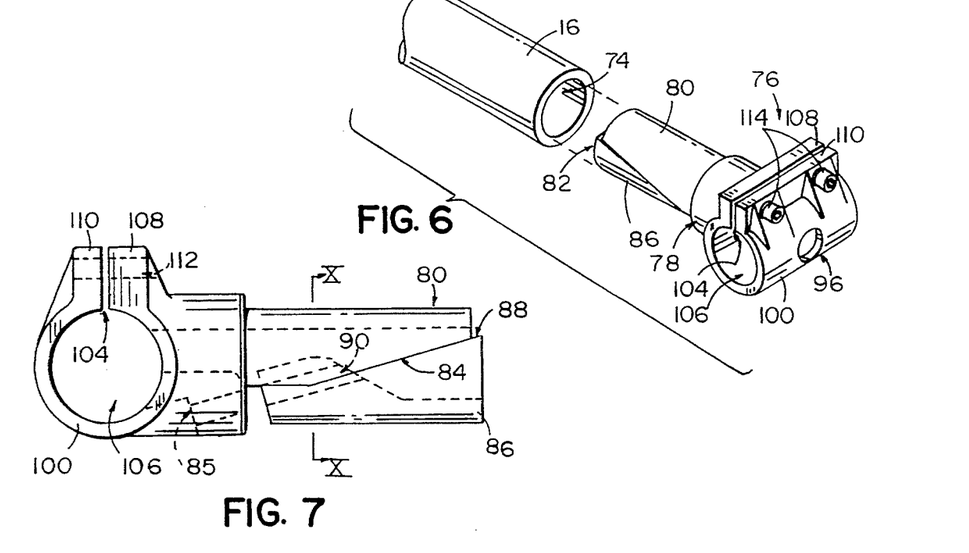
FIG. 6 is a fragmentary exploded view of a union of the assembly shown in FIG. 5.
FIG. 7 is a side elevational view of the union shown in FIG. 6.
Figure 8:
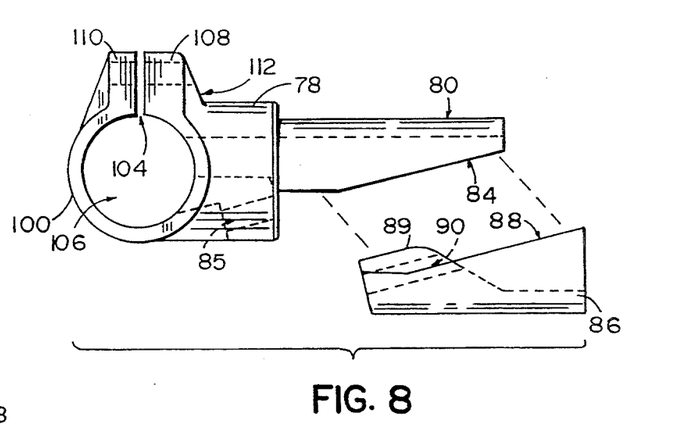
FIG. 8 is an exploded side elevational view of the union shown in FIG. 6.
Figure 9:
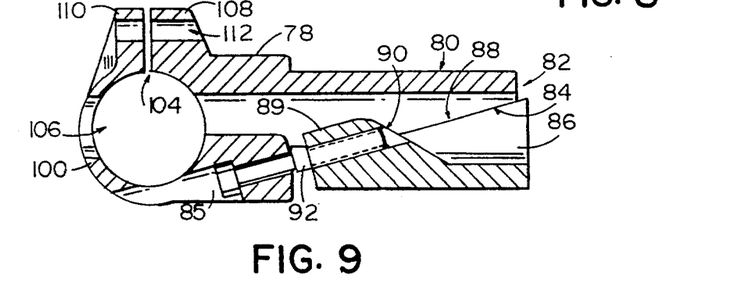
FIG. 9 is a centerline cross-sectional view of the union shown in FIG. 7.

As shown in FIG. 6, boom 16 has an inner wall defining an interior cavity 74 extending through one end of boom 16 and along longitudinal axis 30 over at least a portion of a length of boom 16. As discussed above, boom 16 most preferably has a circular cross section with an outside diameter of about two and one-half inches. Further, cavity 74 most preferably has a circular cross section with a diameter of about two inches, although other dimensions and configurations may be used for particular applications of assembly 70.

As shown in each of FIGS. 6-9, union 76 has a body 78 and a cooperating stem 80 adapted to couple in sliding engagement with cavity 74. Stem 80 is generally shaped similar to a section of a hollow cylinder, that extends from body 78 to a terminal end 82. The lower region of what would otherwise be a cylindrical stem 80 is absent, so that stem 80 has an inclined surface 84 extending from terminal end 82 toward body 78. This provides stem 80 with a somewhat inverted "U" shape (FIG. 10) with inclined surface 84 being formed along the opposed bottoms of the "legs" of the "U." On the underside of body 78 is formed a socket 85. Socket 85 seats a threaded adjustment bolt or draw member 92 which is used to lock union 76 in position. Socket 85 is generally smoothly bored so that bolt 92 turns freely in socket 85, but the enlarged head of bolt 92 seats in socket 85 and prevents bolt 92 from being pulled all the way through socket 85. The elongated opening of socket 85 extends generally parallel to the angel of inclined surface 84. Socket 85 is positioned on body 78 to be outside of boom 16 when stem 80 is received in cavity 74. Socket 85 is also accessible beneath rail 14 when union 76 locks rail 14 into position.

Union 76 also includes a cam 86 having a cooperating cam surface 88 for abutting inclined surface 84 in sliding engagement. Cam 86 slides between an open position in which stem 80 and cam 86 are releasably received within cavity 74, and a closed or locked position in which stem 80 and cam 86 are rigidly fixed within cavity 74, firmly securing union 76 to boom 16. Cam 86 is also shaped generally similar to a section of a hollow cylinder, so that cam 86 has a generally U-shaped cross section with inclined cam surface 88 being formed along the opposed tops of the "legs" of the "U" (FIG. 10).

Further, cam 86 has an adjustment lobe 89, through which extends a threaded, cylindrical aperture 90 that is most preferably oriented generally parallel to cam surface 88. Adjustment lobe 89 is located at the outboard end of cam 86 and is located within the hollow, generally cylindrical body formed by mated stem 80 and cam 86. Threaded aperture 90 receives cooperating threaded bolt or draw member 92. Bolt 92, therefore, interconnects cam 86 and stem 80, providing the function of sliding cam 86 relative to stem 80. While bolt 92 may be turned freely in socket 85, threaded aperture 90 causes cam 86 to be drawn toward socket 85 as bolt 92 is turned. Because the orientation of socket 85 and aperture 90 is parallel to inclined surfaces 84 and 88, bolt 92 is oriented generally parallel to the angle of inclined surfaces 84 and 88. Thus, the sliding force to move cam 86 is focused along the direction of sliding movement for cam 86. One will understand that cam 86 "ramps" up and down relative to stem 80 as cam 86 slides along inclined surface 84, and will appreciate the benefit of orienting bolt 92 generally parallel to inclined surfaces 84 and 88 to avoid unnecessary "toggling" forces which would be created by positioning bolt 92 away from the angle of inclined surfaces 84 and 88, such as toward alignment with boom 16, for example.

Both stem 80 and cam 86 have flattened, and preferably generally planar side walls 94 (FIG. 10). As shown in FIG. 10, when cam 86 and stem 80 are mated with cam surface 88 abutting inclined surface 84, stem 80 and cam 86 cooperate to define a roughly cylindrical shape, but which configuration has a pair of narrowed, and preferably generally planar opposing sides 94. This causes the stem 80, cam 86 combination to have a somewhat oblong cross section with a width across sides 94 that is most preferably dimensioned at about one and seven-eighths inches, and a height greater than the width. Each of stem 80 and cam 86 preferably has a cylindrical surface 96, 98, respectively, extending between side walls 94 to cooperatively provide what would otherwise be the diameter of the cylinder. Each of cylindrical surfaces 96 and 98 is most preferably defined by an arc with a radius of about thirty-one, thirty-seconds of an inch, so that the assembled pair of stem 80 and cam 86 slide freely into cavity 74 with about one-sixteenth of an inch clearance when cam 86 is in an open position.

While particular dimensions are provided for the inside diameter of boom 16 and the radius of arc of surfaces 96 and 98, it is noted that union 76 is useful and performs equally well with booms having larger and smaller diameters than the particular diameter dimension discussed herein in connection with boom 16. As discussed above, when cam 86 slides along inclined surface 84 toward body 88, cam 86 ramps up incline surface 84, increasing the dimensional height across cam 86 and stem 80 (FIG. 10). Conversely, as cam 86 slides along incline surface 84, away from body 78, the dimensional height across stem 80 and cam 86 decreases. Thus, one will understand that union 76 may be used with various booms 16, having a range of inside diameter dimensions.

Further, the usefulness of union 76 with small diameter booms 16 is extended by the presence of side walls 94 which define the cross section of each of stem 80 and cam 86 as a truncated circular section and provide a narrow width across each of cam 80 and 86. Those who practice the present invention will understand that the width of the cross sections of item 80 and cam 86 is a limiting factor regarding how small of a boom 16 will be accommodated. Thus, by truncating the widths of stem 80 and cam 86, the range of small booms 16 which are accommodated by union 76, is extended.

Body 78 is adapted to releasably receive and hold side rail 14, and is most preferably configured as a cylindrical or split sleeve type clamp. Thus, body 78 defines a generally cylindrical portion 100 having an open side defining a gap 104 and a cylindrical receiving area 106 in which side rail 14 is releasably received. Depending upon the particular application, side rail 14 may have an outside diameter from about one inch to about two and one-half inches. Thus, receiving area 106 may be dimensioned with an inside diameter slightly larger than the outside diameter of the particular side rail 14 used. Alternatively, receiving area 106 may be sized slightly larger than the largest diameter side rail 14 to be used, with use of smaller diameter side rails then accommodated by split sleeve shims 105 interposed between the side rail 14 and cylindrical portion 100 (FIG. 5).

A pair of parallel clamping flanges 108, 110 extend along and adjacent gap 104. A pair of apertures 112 extend through each of flanges 108, 110, and are provided to receive clamping bolts 114. Thus, that portion of each aperture 112 which extends through flange 108 is preferably threaded to receive bolts 114 in screw engagement.

In use, union 76 may be fit to a support boom 16 by placing cam 86 in an open position and inserting stem 80 and cam 86 into cavity 74 of boom 16. If cam 86 is not already in an open position for union 76 to be received in cavity 74, then bolt 92 may be unscrewed to allow cam 86 to slide away from body 78 a sufficient distance so that union 76 will be received in cavity 74. Once union 76 is received in cavity 74, bolt 92 may be tightened to draw cam 86 toward body 78. As cam 86 approaches body 78, cam surface 88 slides along inclined surface 84 to wedge stem 80 and cam 86 against the inside of boom 16. Bolt 92 applies a tightening force parallel to the camming surfaces of stem 80 and cam 86, so that the tightening forces are focused along the camming surfaces and are directly applied to avoid binding which may otherwise falsely indicate or prevent a rigid connection.

Side member 14 is received in cylindrical area 106 of union 76 and securely fastened therein by tightening clamping bolts 14. As clamping bolts 14 tighten, clamping flanges 108 and 110 draw toward one another, closing gap 104 and drawing cylindrical portion 100 snugly around side rail 14. If adjustment of the rotational orientation of side rail 14 relative to boom 16 is required, bolt 92 may be loosened and union 76 rotated within boom 16 to the desired position, and bolt 92 retightened to secure union 76 at that position.

It is noted that the order of coupling union 76 with boom 16 and of coupling side rail 14 with union 76 is not of particular importance, but either coupling may occur first, according to the preference of the user.

It will be understood by one skilled in the art that various modifications and improvements may be made without departing from the spirit of the concept disclosed herein. The scope of protection afforded is to be determined by the claims which follow and the breadth of interpretation which the law allows.

The embodiments of the invention in which an exclusive property or privilege is claimed are defined as follows:

1. An instrument and vacuum cup support boom assembly, comprising:
    a boom having a longitudinal axis and an inner wall defining a cavity, said cavity extending along said axis and through one end of said boom;
    at least one side member with an instrument mounted thereon;
    a union adjustably and releasably coupling said one side member with said boom, said union having an elongated body extending along said axis, said body including a first end, including a received portion adjacent said first end, said received portion being positioned in said cavity, and including a second end opposite said first end, said second end being connected with said one side member; said union having an inclined surface extending over said received portion, from said first end toward said second end; and said union having a cam with a cooperating cam surface abutting said inclined surface in sliding engagement, said cam and said received portion defining a passage therebetween, said passage extending at least through said cam, at least one of said received portion and said cam having aligned, narrowed opposing flattened sides defining a width narrower than about a minimum of a variable, combined cooperative height of said received portion and said cam; and
    a draw member interconnecting said cam and said body to slide said cam relative to said body, said draw member having an elongated body oriented generally parallel to said inclined surface.

2. An instrument and vacuum cup support boom assembly, comprising:
    a first boom with an inner wall defining a cavity extending along a length of said first boom and through one end of said first boom;
    a second boom oriented about perpendicular to said first boom; and
    a union interconnecting said first boom and said second boom, said union having an inserted section; having a mating cam, each of said inserted section and said cam having a cooperating inclined camming surface, said inserted section and said cam mating to form a generally cylindrical shape having narrowed side walls defining a width and a variable height, said height being: no less than about equal to said width; and having a draw member adjustably coupling said inserted section and said cam with said draw member extending generally parallel to said camming surfaces.

3. The assembly defined in claim 2 wherein said inserted section and said cam each have a generally U-shaped cross section.

4. An instrument and vacuum cup support boom assembly, comprising:
    a first boom with an inner wall defining a cavity extending along a length of said first boom and through one end of said first boom;
    a second boom oriented about perpendicular to said first boom; and
    a union interconnecting said first boom and said second boom, said union including an inserted section; said union including a mating cam with an inside surface and a lobe on said inside surface, said lobe defining a threaded adjustment aperture, each of said inserted section and said cam having a generally U-shaped cross section, and having: a cooperating inclined camming surface, said inserted section and said cam mating to form a generally cylindrical shape with a variable height and narrowed side walls defining a width, said height being no less than about equal to said width; and said union including a draw member adjustably coupling said inserted section and said cam, said draw member engaging said threaded adjustment aperture and extending generally parallel to said camming surfaces.

5. The assembly defined in claim 4 wherein each of said narrowed side walls is about perpendicular to said inclined camming surface.

6. The assembly defined in claim 4 further including at least one coupling adjustably coupling a side member to said boom, said coupling comprising a pair of coupling blocks, said coupling blocks having first ends with a first adjustable fastener extending therebetween, said coupling blocks having second ends with facing mounting surfaces adapted to clampingly mount said side member therebetween and a second adjustable fastener extending between said second ends, and said coupling blocks having intermediate clamp sections extending about said boom outer circumference at an oblique angle sufficient to offset said first ends from said second ends along said longitudinal axis.

7. The assembly defined in claim 2 wherein each of said narrowed side walls is about perpendicular to said inclined camming surface.

8. A union to couple first and second booms of an instrument and vacuum cup support boom assembly, the second boom having a cavity extending along a length of the second boom and opening through one end of the second boom, the union comprising:
- a body adapted to releasably receive and hold the first boom along an axis;
- a stem extending from said body to a terminal end and coupled in sliding engagement with the cavity in the second boom, said stem having an inclined surface extending toward said body from said terminal end;
- a cam with a cooperating cam surface abutting said inclined surface in sliding engagement, said cam sliding between an open position in which said stem and cam are releasably received within and removable from the cavity in the second boom, and a locked position in which said stem and cam are fixed within the cavity in the second boom, said stem and said cam having a pair of aligned, flattened, opposing side walls, said stem and said cam defining a passage therebetween, said passage extending at least through said cam; and
- a draw member interconnecting said cam and said body to slide said cam relative to said body, said draw member having an elongated body oriented generally parallel to said inclined surface.

9. The assembly defined in claim 6 wherein said stem and said cain each have a generally U-shaped cross section.

10. An instrument and vacuum cup support boom assembly, comprising:
- a first boom with an inner wall defining a cavity extending along a length of said first boom and through one end of said first boom;
- a second boom oriented about perpendicular to said first boom; and
- a union interconnecting said first boom and said second boom, said union including an inserted section; said union Including a mating cam with an inside surface and a lobe on said inside surface, said lobe defining a threaded adjustment aperture, each of said inserted section and said cam having a cooperating inclined camming surface, said inserted section and said cam mating to form a generally cylindrical shape with a variable height and narrowed side walls defining a width, said height being no less than about equal to said width, each of said narrowed side walls being about perpendicular to said inclined camming surface; and said union including a draw member adjustably coupling said inserted section and said cam, said draw member engaging said threaded adjustment aperture and extending generally parallel to said camming surfaces, said inserted section and said mating cam defining a passage therebetween, said passage extending at least through said cam.

11. The assembly defined in claim 10 wherein each of said flattened side walls is about perpendicular to said inclined surface.

* * * * *

UNITED STATES PATENT AND TRADEMARK OFFICE
CERTIFICATE OF CORRECTION

PATENT NO. : 5,411,232  
DATED : May 2, 1995  
INVENTOR(S) : Donald L. Hufford

Page 1 of 3

It is certified that error appears in the above-indentified patent and that said Letters Patent is hereby corrected as shown below:

Column 1, line 29  
"rial" should be --rail--;

Column 1, line 39  
"stein" should be --stem--;

Column 1, line 61  
"tile cam" should be --the cam--;

Column 1, line 61  
"along tile" should be --along the--;

Column 1, line 63  
"tile same" should be --the same--;

Column 1, line 67  
"stein as tile" should be --stem as the--;

Column 2, line 4  
"tile inclined" should be --the inclined--;

Column 2, line 7  
"stein" should be --stem--;

Column 2, line 9  
"tile cavity" should be --the cavity--;

Column 2, line 51  
"from tile" should be --from the--;

UNITED STATES PATENT AND TRADEMARK OFFICE
CERTIFICATE OF CORRECTION

PATENT NO. : 5,411,232
DATED : May 2, 1995
INVENTOR(S) : Donald L. Hufford

It is certified that error appears in the above-indentified patent and that said Letters Patent is hereby corrected as shown below:

Column 2, line 61
"tile clamp" should be --the clamp--;

Column 2, line 67
"tile present" should be --the present--;

Column 3, line 5
"view of tile" should be --view of the--;

Column 3, line 9
"tile union" should be --the union--;

Column 3, line 45
"of oblong" should be --or oblong--;

Column 5, line 29
"angel" should be --angle--;

Column 6, line 6
"cain" should be --cam--;

Column 6, line 43
"cam 80 and 86" should be --stem 80 and cam 86--;

Column 6, line 45
"item 80" should be --stem 80--;

Column 8, line 22, claim 2
After "being" delete --:--;

UNITED STATES PATENT AND TRADEMARK OFFICE
CERTIFICATE OF CORRECTION

PATENT NO.  : 5,411,232
DATED       : May 2, 1995
INVENTOR(S) : Donald L. Hufford It is certified that error appears in the above-indentified patent and that said Letters Patent is hereby corrected as shown below:

Column 8, line 43, claim 4
After "having" delete --:--;

Column 10, line 2, claim 9
"cain" should be --cam--; and

Column 10, line 13, claim 10
"Including" should be --including--.

Signed and Sealed this

Seventh Day of November, 1995

Attest:

BRUCE LEHMAN

*Attesting Officer*       *Commissioner of Patents and Trademarks*